April 16, 1957     G. E. WHITE     2,789,192
VIBROMETERS
Filed July 15, 1950     3 Sheets-Sheet 1
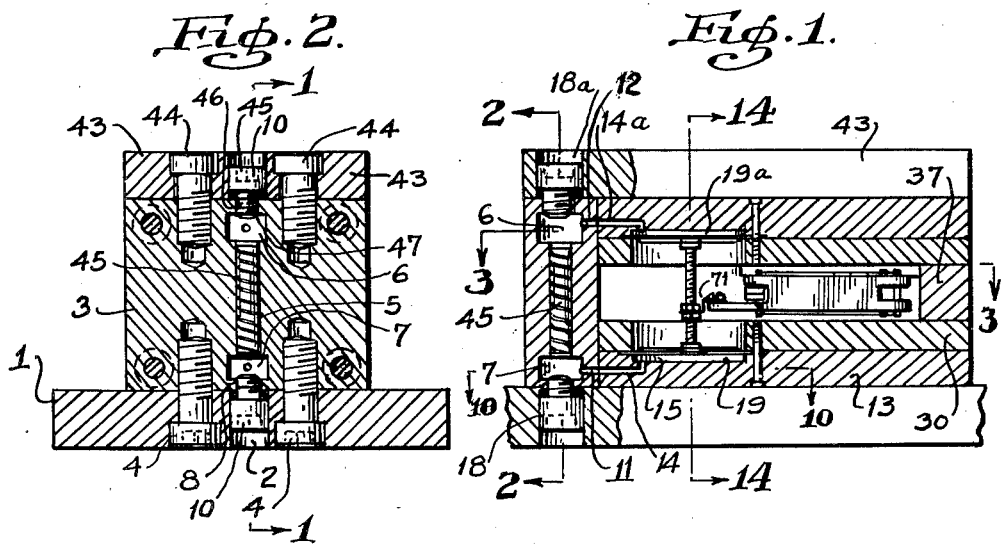
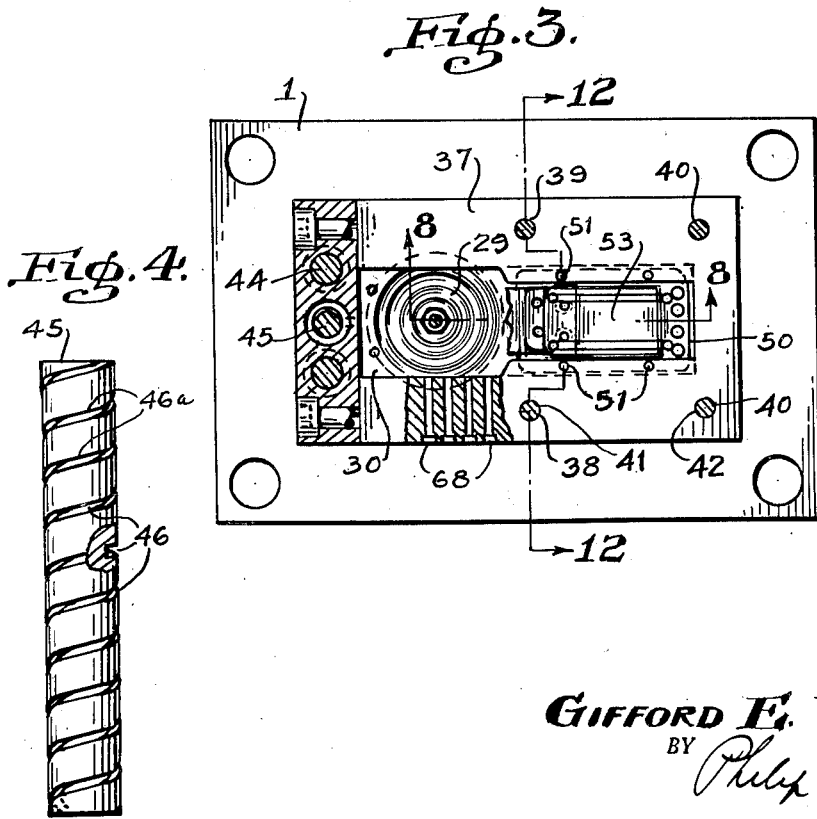
INVENTOR.
GIFFORD E. WHITE
BY
ATTORNEY.

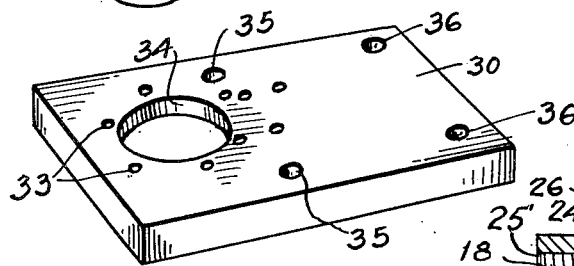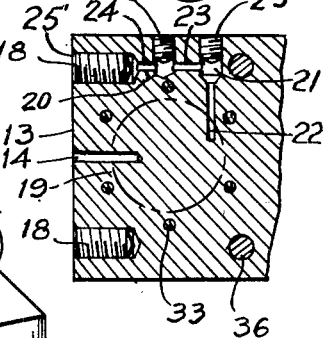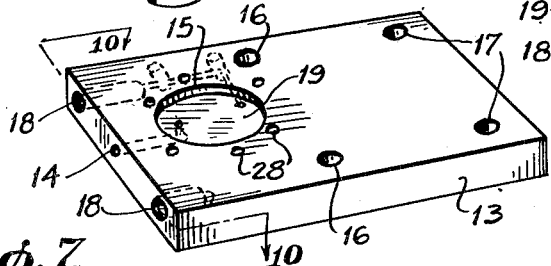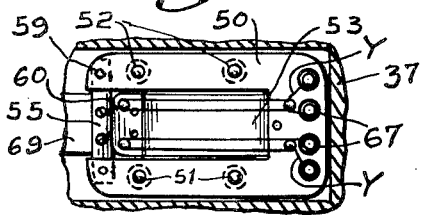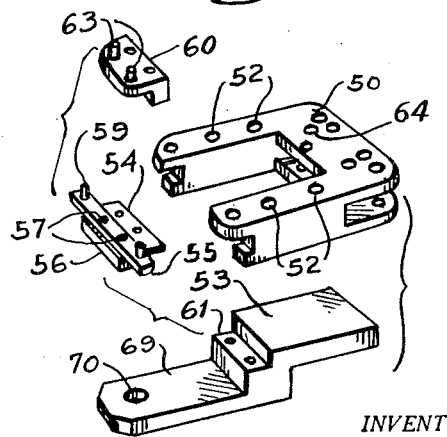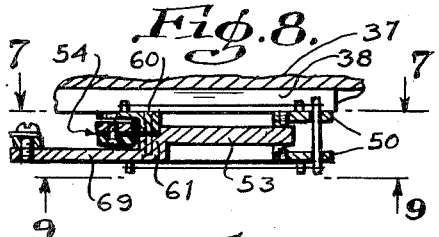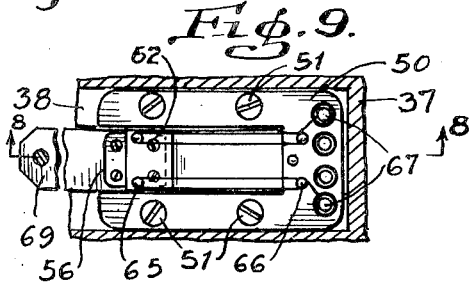

April 16, 1957
G. E. WHITE
2,789,192
VIBROMETERS
Filed July 15, 1950
3 Sheets-Sheet 3
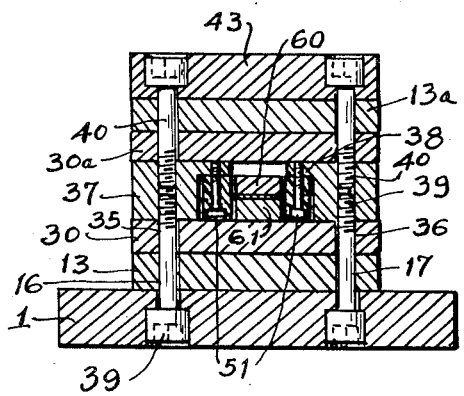
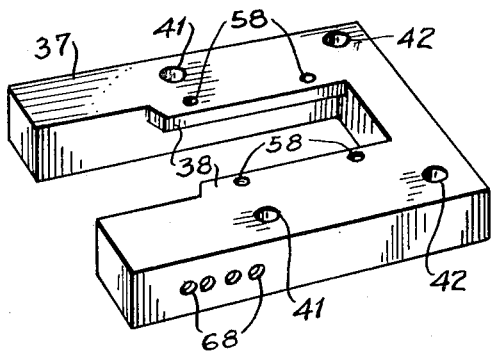
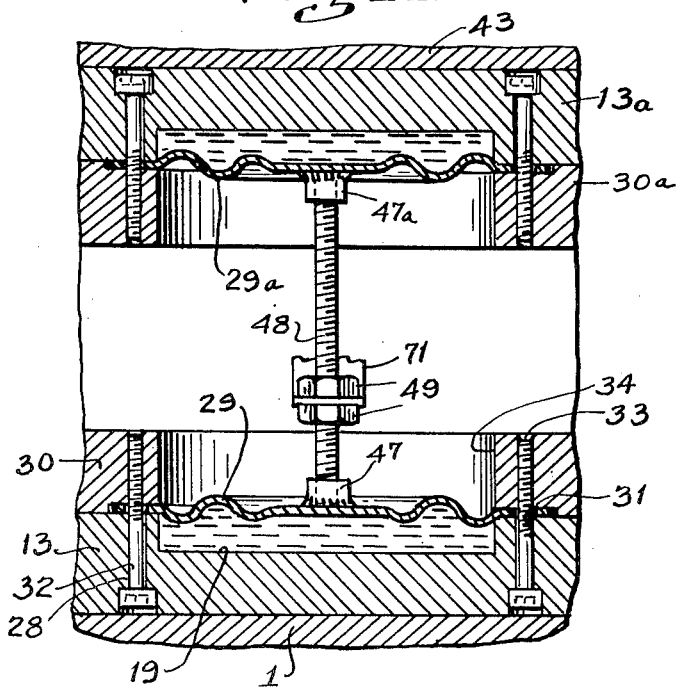
INVENTOR.
*GIFFORD E. WHITE*
BY
*ATTORNEY.*

United States Patent Office 2,789,192
Patented Apr. 16, 1957

2,789,192
VIBROMETERS

Gifford E. White, Tarzana, Calif., assignor to Statham Laboratories, Inc., Beverly Hills, Calif., a corporation of California Application July 15, 1950, Serial No. 173,995

6 Claims. (Cl. 201—63)

Vibrometers are instruments for the measurement of displacement, particularly of a body undergoing sinusoidal motion. They are in their essential characteristics seismic systems composed of a mass suspended on springs in a frame, with some means for indicating the relative motion of the frame and mass.

In order to measure displacement of the frame with respect to the mass, it is necessary that the frequency of the vibrations (sinusoidal movement) be well above (preferably several times) the natural frequency of the spring suspended system, employing, also, proper damping. Such a mass will be fixed in space and the movement of the frame with respect to the mass may be measured.

It has been found that there are a number of difficulties with such vibrometers which severely limit their usefulness. If it is desired to use them to measure the displacement occurring at low frequencies, the natural frequency of the system must be reduced to small values. This requires weak spring suspensions.

Such a design has the following characteristics which limit its utility. The relative motion of the frame and the mass is equal to the motion of the frame in space. Thus, for large motions the instrument must permit of such large relative motion of the frame and mass in the instrument case. Thus the instrument must be relatively large and cannot be used to measure displacement of masses where space for mounting the instrument is limited. Soft suspension springs which allow large motions suffer independent vibrations which interfere with the determination of the vibration of the frame which it is sought to measure. These contradictory requirements create a dilemma which has not been solved in the prior art.

I have developed a vibrometer which solves this dilemma and operates on an entirely different principle in that I do not employ a solid mass suspended on springs as in the systems of the prior art, but instead employ a fluid mass, in a container, having a yieldable wall. If the container is vibrated, the fluid mass will create a pressure and move the yieldable wall proportionately. The displacement of the yieldable wall with respect to the container may be detected and will thus measure the displacement of the container. The displacement of the yieldable wall will be proportionate to the displacement of the container, and I have found that by proper design of the container and the yieldable wall this ratio may be one or more or less than one, instead of only one as in the prior art spring suspended, solid mass systems. The displacement of the yieldable wall can be made any desired fraction of the displacement of the container and this fraction will be the same irrespective of the frequency at which the instrument is vibrated provided that it be substantially greater than the natural frequency.

I may control the natural frequency and make it small by reducing the stiffness or spring rate of the yieldable wall and by proper design of the geometry of the fluid system.

The dilemma of the prior art is avoided in my instrument by employing, instead of the ordinary weight mass of the fluid, as in the case of the prior art instruments employing solid masses, the dynamic mass resulting from the relative motion of the container and fluid. This I attain by designing the container to have a peculiar goemetry. The container of my invention is preferably composed of two chambers at least one of which has a yieldable wall, i, e., being a chamber of variable volume. The two chambers are spaced apart in the direction of the motion to be measured. The containers are connected by a conduit which may be equal to or greater than the shortest distance between the points of connection of the conduit to the chambers, said distance being measured in the direction of motion of the instrument. Means are provided to measure the displacement of the yieldable wall on displacement of the container. With a container of such design, the natural frequency will be of smaller value for any spring rate of the yieldable wall and any chosen fluid, the smaller the cross-sectional area of the conduit and the larger the cross-sectional area of the yieldable wall and the longer the length of the conduit. The natural frequency may be further modified by a proper choice of the fluid. Thus, the natural frequency of the system may be increased by employing a fluid of low density and decreased by employing a fluid of higher density.

Thus, I can, because of this flexibility of design, employ a relatively stiff yieldable wall and thus improve the faithfulness of response by suppression of independent or accidental vibrations of the yieldable wall which are independent of the frequency movement of the container. I may do this and also obtain a natural frequency of any desired amount. Since I can thus independently alter the effective mass of the system without enlarging the dimensions of the instrument unduly, I have obtained a design which can operate to determine large or small displacements with instruments of small dimensions, and, in fact, substantially less in dimension in the direction of the displacement to be measured than the dimension of the displacement.

I can with my instruments determine and record motions less than or greater than the dimensions of the instrument measured in any principal direction of motion to be measured. In these respects my instrument is materially different from the instruments of the prior art, since in such prior art the spring mass must move relative to the frame on which it is supported through a distance equal to the displacement to be measured and thus practically the enclosing case of the instrument must be of greater dimension, measured in the direction of the displacement to be observed, than the magnitude of such displacement.

Because I can thus limit the deflection of the yieldable wall, I may employ sensitive motion indicators such as unbonded strain gages as described in Patent No. 2,453,549, the permitted displacement of which is small. This I may do without employing high mechanical leverage ratios which impair the sensitivity of the instrument to measure small displacements of the instrument. I may accomplish this purpose while permitting the instrument to measure the full range of the displacement, and indeed up to many times the permitted displacement, of the armature of the strain wire gage.

This is particularly important when using unbonded strain gages, in which in the commercial types the permitted displacement of the armature is of the order of 0.001 to about 0.03 inch. Thus, I can, even without interposing a multiplying lever, measure displacement of the instrument corresponding to a diaphragm displacement of such magnitude.

It is thus an object of my invention to design an instrument capable of indicating a displacement or some function of the displacement of objects undergoing vibration or some other form of sinusoidal or cyclic motion, said instrument containing operating parts subject to a movement in space which is proportional to the said displacement, which proportionality may be made equal to or greater than or less than one.

It is a further object of my invention to design such an instrument which has any desired natural frequency and one in which said proportionality may be made to be equal to, less, or greater than one.

It is a further object of my invention to design such an instrument employing a container having a yieldable wall in which is positioned a fluid such that the sinusoidal movement of the case creates a deflection of the yieldable wall which is proportionate to the magnitude of the displacement at all times during said sinusoidal movement.

It is a further object of my invention to design said container to have at least two chambers, at least one of which shall have a yieldable wall, said two two chambers connected by a conduit and filled with fluid, with means for detecting the movement of said yieldable wall on movement of said container in space.

In the drawings:

Fig. 1 is a vertical section of a preferred form of my invention taken along line 1—1 of Fig. 2 (with parts in elevation and parts broken away);

Fig. 2 is a section taken along line 2—2 of Fig. 1;

Fig. 3 is a top plan view with parts broken away and parts in section;

Fig. 4 is a detail of the plug with the helical passageway;

Fig. 5 is a perspective view of one element of my invention;

Fig. 6 is a perspective view of another element of my invention;

Fig. 7 is a section taken on line 7—7 of Fig. 8;

Fig. 8 is a section taken on line 8—8 of Fig. 3;

Fig. 9 is a section taken on line 9—9 of Fig. 8;

Fig. 10 is a fragmentary section taken on a plane through the center of the bores 14 and 18 of Fig. 6 and parallel to one of the faces;

Fig. 11 is an exploded view of the sensing element frame and armature;

Fig 12 is a section taken along line 12—12 of Fig. 3;

Fig. 13 is a perspective view of one of the main frame elements of the instrument; and Fig. 14 is a fragmentary section taken along line 14—14 of Fig. 1.

The base 1 carrying a bore 2 has mounted thereon a vertical plate 3 suitably secured to the base 1 by means of screws 4. The instrument is mounted on the object whose motion is to be determined by means of screws passing through bores provided in base 1 (Fig. 3) and into the object whose motion is to be determined. The plate 3 carries a bore 5 terminating in chambers 6 and 7. The chamber 7 communicates with the tapped bore 2 by a short threaded bore 8 into which the screw head of the screw 10 projects. The plate 3 is drilled to provide a horizontal bore 11 which communicates with the chamber 7 and a horizontal bore 12 which communicates with the chamber 6.

The plate 13 bearing the bore 15, which is not bored completely through the plate, as is indicated in Fig. 6, forms a cup 19 which with the diaphragm 29 form the chamber 19 as described below. Bore 14 is bored in the end of the plate 13. Bores 16 and 17 are formed in the face of the plate 13, and end bores 18 are positioned in the end of the plate. Cross bores 20 to 24, inclusive, are provided for venting of the cup 19, as will be described below. Plugs 25, 25', and 26 are provided to seal the vent hole. A ring of bores 28 is provided around the bore 15.

A diaphragm 29 is positioned over the cup 19 and clamped between the plate 13 and the plate 30 by means of a ring of screws 32 passing through the bores 28 and similar bores 31 in the diaphragm 29 and threaded bores 33 in the plate 30. A suitable bore 34 is positioned in the plate 30 in registry with the bore 15. Suitable screws pass through the bores 16, 17, 35, and 36 to securely clamp the diaphragm 29 between the plates 13 and 30 and to mount the plates in the base.

The frame plate 37 carrying lips 38 is mounted on the plate 30 and on the screws 39 and 40 which pass through tapped bores 41 and 42 in the frame 37 and in the bores 16, 17, 35, and 36 of the plates 13 and 30.

A plate 13a and 30a, of construction identical (except as stated below), respectively, to the plates 13 and 30, carry, clamped between them, the diaphragm 29a of construction identical to the diaphragm 29, i. e., of the same configuration and stiffness. The plates 13a and 30a are positioned on the top of the frame element 37 and held in position by the screws 39 and 40 which pass through the bores similar to the bores 16, 17, 35, and 36 to securely clamp the diaphragm 29a between the plates and to securely fasten the plates to the frame 37. Bores 18a similar to 18 receive screws passing through the end plate 3 in the same manner as is provided for the lower plate 13. A top or cup plate 43 is placed on the plate 30a and secured to the plate by the screws 39 and 40 which pass through suitably provided tapped bores in the plate 43 and by screws 44 which pass through the plate 43 into the top of the end plate 3. The chamber 6 is closed by a screw 10 having a screw end 46 which projects into and seats in the short threaded bore 47 connecting to the chamber 6.

It will be observed that there is thus provided two identical reservoirs 19 and 19a of equal area and depth formed by the plates 13 and 13a, respectively, and covered by flexible diaphragms 29 and 29a. To each of these is connected a tubular passageway 14 and 14a which connect, respectively, to the passageways 11 and 12 in a fluid-tight seal. It is unnecessary to provide vent holes 20 to 24, inclusive, in both the plates 13 and 13a and they may be placed in one of these plates only.

A cylindrical rod 45 suitably grooved with a spiral groove or thread 46 makes a friction fit in the bore 5. Thus there is a continuous fluid passageway from chamber 19 via 14, 11, and 7, the helical passageway 46a between the threads 46 and the wall of the bore 5, the chamber 6, and the passageways 12 and 14a. These passageways form a fluid conduit from chamber 19 to chamber 19a. The longitudinal length of this conduit from chamber 19 to chamber 19a will be termed hereafter the length of the fluid conduit.

The diaphragms 29 and 29a each have soldered to their center a boss 47 and 47a, respectively. These bosses are connected by a centrally positioned threaded rod 48 on which are mounted nuts 49. The movement of the rod 48 may be sensed by a sensing element of any desired construction. A suitable, and in my view preferable, device is an unbonded strain gage such as is described in a Statham Patent No. 2,453,549. The frame 50 of the gage is mounted underneath the lips 38 by means of screws 51 which pass through suitable bores 52 in the frame 50 and into tapped holes 58 in the frame 37. The armature 53 is suspended on the frame by means of the flexible spring strip 54 which is clamped between the clamping blocks 55 and 56 by means of screws 57 and mounted in the bores 58 in the lips 38 by means of screws 59. The other end of the strip 54 is clamped between the clamping blocks 60 and the shoulder 61 of the armature 53 by means of screws 62.

Mounted on the upper face of the block 60 are two insulated pins 63 and mounted in the bores 64 of the upper face of the frame are two similar pins, and strain wires are wound on these pins in the now conventional manner. Similarly pins are positioned at 65 and 66 on the underneath side of the armature 53 and frame 50, and strain wires are mounted thereon. The four sets of strain wires are connected each to an insulated terminal pin 67 mounted in the frame 50 and these terminal pins are connected to four insulated terminal pins 68 mounted in the bores in the frame element 37. The armature 53 is connected to the rod 48 by means of the spring 71 which is bolted to the armature extension 69 at 70 and clamped between the nuts 49.

The instrument when assembled comprises a casing formed of members 1, 3, 37, 13, 13a, 30, 30a and 43, having two chambers 19 and 19a, each closed by a diaphragm 19 and 19a, and connected by conduit 46a. The chambers and conduit as will appear from the description given above, are filled with mercury or other suitable fluid through the filling and vent holes 21 and 22 by removing the plug 25. When filled and plugged, the instrument may be calibrated by measuring the unbalance of a strain gage Wheatstone bridge for various deflections. Thus the unbalance of the bridge of the strain gage measures the movement of the instrument. On upward movement of the instrument a pressure is generated in the lower compartment 19 and a region of reduced pressure is generated in the upper compartment 19a due to a movement of fluid from compartment 19a to the compartment 19, through the conduit, the result being a deflection D of each of the diaphragms 29 and 29a.

The relationship of the displacement of the instrument in space to the movement of the diaphragm in space is given as Equation 1:

$$D = \frac{A}{a} \cdot \frac{ly}{d} \qquad \text{Eq. 1}$$

$D$ = the magnitude of any displacement of the instrument when undergoing sinusoidal movement, as, for example, when mounted on a vibrating member;

$A$ = the effective area of each diaphragm 29 and 29a exposed to the fluid. The effective area is defined here as that area which when multiplied by the displacement Y of the diaphragm equals the volume change of the fluid in the chamber. Where the diaphragms are of unequal area, and the sensing element is connected to one only, the area A is the effective area of the diaphragm to which the sensing element is connected;

$a$ = the weighted area of the conduit connecting 19 and 19a; where the conduit is of different cross sectional area for different lengths thereof, the area will be the average weighted for these varying lengths;

$l$ = the total linear length of the conduit as explained above;

$d$ = the linear distance between the diaphragms measured in the direction of the motion of the instrument;

$Y$ = the magnitude of the displacement of the diaphragms 29 and 29a.

The above Equation 1 assumes that the chambers, e. g., 29 and 29a, are of such large cross sectional area and of such small depth that the kinetic energy imparted to the fluid in the chamber, when the instrument is moved, is so small, as compared to that in the conduit, that it may be ignored and also that the mass of the diaphragms 29 and 29a, rod 48, and parts connected thereto are small and may be ignored.

The natural frequency of the instrument, i. e., the natural frequency of oscillation of the rod or armature (whose mass is negligible and may be ignored) is given by Equation 2:

$$f_n = \tfrac{1}{2}\pi \sqrt{\frac{k}{r.l.A^2/a}} \qquad \text{Eq. 2}$$

when $f_n$ is the natural frequency of the instrument; $k$ = the spring constant (Hooke's law constant) of the diaphragms 29; 29a and of the strain gage; $r$ = the density of the fluid; and the other symbols have the significance as above.

The damping ratio $h$, i. e., the fraction of the critical damping, of the instrument is given approximately by the following Equation 3, the exact value depending on the geometry of the cross section $a$, i. e., whether square or circular in cross section:

$$h \approx \frac{8\pi u l \left(\frac{A}{a}\right)^2}{2\sqrt{k.r.l.\frac{A^2}{a}}} \qquad \text{Eq. 3}$$

where $u$ is the viscosity of the fluid, and for mercury may be taken as 15.47 millipoises at 20° C., and all other symbols have the above significance.

For best operations of this device, as a displacement meter I desire to fix the values of $h$ to be in the range of about .5 to about .8 and preferably as close to .7 as is practicable. When so designed, with such damping ratio, the instrument of my invention is stable and will give faithful response to and record the motion of the instrument.

These equations indicate the versatility of the instrument of my invention. It will be observed by proper proportioning of the area of the diaphragms 29 and 29a, the cross sectional areas of the fluid conduit and the length thereof, that the displacement D which may be measured by any deffection Y of the diaphragm can be made to be equal to or greater or less than Y, since it can be made to bear any reasonable relation to Y.

Thus, for example, to illustrate the principles of the construction illustrated above, and without limiting the invention, the instrument may have values of the parameters as follows (employing mercury of density 13.6 gm./cm.$^3$ and a value of $u$ = .015 poise):

$A$ = 2 cm.$^2$, $l$ = 6cm., $d$ = 3cm., $Y$ = .025 cm.
$a$ = .004 cm.$^2$; $k$ = 1.95×10$^6$ dynes/cm.

Such an instrument will have a range D of about 25 cm. or more than 8 times the distance between the chambers and 1000 times the displacement of the diaphragms. The critical damping $h$ has a value of about .7 of critical. The instrument has a natural frequency $f_n$ of about 0.8 cycles per second.

It will be observed that the ratio of $$\frac{A}{a} \cdot \frac{l}{d}$$

is a leverage ratio and states the leverage effect of the conduit connecting the chambers 19 and 19a. Thus the conduits connecting the chambers 19 and 19a as shown in the drawings may be entirely omitted and replaced by a bore in the rod 48 which will thus connect chamber 19 and 19a. In such case $l$ = $d$ and the leverage ratio is dependent only on the ratio of the area of the diaphragms to the cross-sectional area of the bore.

It will also be observed that the natural frequency may be made as low as desired or as high as desired by proper choice of the spring constant $k$, the choice of fluid employed, and the values $l$, A and $a$.

The instrument of my invention may also be employed to determine the acceleration or as a velocity meter by adjusting the natural frequency and the damping ratio to the values suitable for use for such purposes, as is the case with a conventional seismic system. The variation of the natural frequency and the damping ratio can be made by adjusting the parameters of the instrument, as described above. Thus, for example, my instrument may be used as an accelerometer. The damping ratio may be set to values stated above for use in the displacement meter. When the frequency of vibration of the system, the acceleration of which is to be determined, is less than about .75 times the natural frequency of the instrument, my instrument will faithfully determine the acceleration.

The instrument may also be employed as a velocimeter by increasing the damping ratio to above critical, for example, a damping ratio of about 10 or more. So damped the instrument will be a useful velocimeter to measure the velocity of a vibration system, vibrating at a frequency in the region of about ⅓ to 3 times the natural frequency of the instrument.

While I have described this device as suitable for measuring vibrational motions, i. e., those undergoing a sinusoidal movement, the device will also be useful for measuring motion during any half of such sinusoidal movement or even a device undergoing linear acceleration in one direction.

While I have described a particular embodiment of my invention for the purpose of illustration, it should be understood that various modifications and adaptations thereof may be made within the spirit of the invention as set forth in the appended claims.

I claim:

1. A device for measuring a function of the motion of an object, comprising a case adapted to be secured to said object, there being a plurality of chambers in said case and spaced apart in the direction of the motion to be measured, each of said chambers having a yieldable wall, said walls being separated in the direction of the motion to be measured, a conduit connecting said chambers of length greater than the linear separation of said yieldable walls in the direction of the motion to be measured and of average cross section less than the effective area of said yieldable walls, the product of the effective area of said yieldable walls and the length of said conduit when divided by the product of said linear separation and the weighted cross-sectional area of said conduit being greater than one, a liquid in said chambers and conduit, and means responsive to the motion of the said yieldable walls and mechanically connected to said yieldable wall for sensing the motion of said liquid relative to said conduit.

2. A device for measuring a function of the motion of an object, comprising a case adapted to be secured to said object, there being a plurality of chambers in said case and spaced apart in the direction of the motion to be measured, each of said chambers having a yieldable wall, said walls being separated in the direction of the motion to be measured, a conduit connecting said chambers of length greater than the said separation of said yieldable walls and of average cross section less than the effective area of said yieldable walls, a liquid in said chambers and conduit, a motion sensing element mechanically connected to at least one of said yieldable walls, the ratio of the product of the effective area of the yieldable wall to which said sensing element is connected and the said length of conduit to the product of the weighted average cross-sectional area of the conduit and the said separation of the yieldable walls being greater than one.

3. A motion measuring device, comprising a case, there being a pair of chambers in said case, spaced apart in the direction of the motion to be measured, diaphragms of substantially equal effective area closing each of said chambers and opposed face to face, a rod connecting said diaphragms, a motion sensing device connected to said rod, a conduit connecting said chambers, a rod in said conduit, substantially a helical groove on said rod, said groove and the wall of said conduit forming a helical passageway in said conduit, and a liquid in said chambers, conduit, and groove.

4. A motion measuring device, comprising a case, a lower plate in said case, there being a chamber in said lower plate, a diaphragm closure for said chamber, an upper plate in said case, there being a chamber in said upper plate, said chambers being spaced apart in the direction of the motion to be measured, a diaphragm closure for said last named chamber, a rod connecting said diaphragms, a motion sensing element connected to said rod, a vertical plate connected to said upper and lower plates, a conduit in said vertical plate connected to each of said chambers, a rod in said conduit in frictional contact with the walls of said conduit, a helical groove in said rod, and a liquid in said chambers, conduit, and groove.

5. A device for measuring the motion of an object, comprising a case adapted to be secured to said object, a lower plate in said case, there being a chamber in said plate, a diaphragm closure for said chamber, an upper plate in said case, a mechanical connection between the upper and lower plates, there being a chamber in said upper plate, said chambers being spaced apart in the direction of the motion to be measured, a diaphragm closure for said last named chamber, a rod connecting said diaphragms, an unbonded strain gage mounted in said device, said strain gage comprising a frame, an armature movably connected to said frame, strain wires connected to said armature and said frame, a connection between the armature of said unbonded strain gage and said rod, a conduit connecting said chambers, and a liquid in said chambers and conduit.

6. A device for measuring the motion of an object, comprising a case adapted to be secured to said object, a lower plate in said case, there being a chamber in said plate, a diaphragm closure for said chamber, an upper plate in said case, there being a chamber in said upper plate, said chambers being spaced apart in the direction of the motion to be measured, a diaphragm closure for said last named chamber, a rod connecting said diaphragms, an unbonded strain gage mounted in said device, said strain gage comprising a frame, an armature movably connected to said frame, strain wires connected to said armature and said frame, a connection between the armature of said unbonded strain gage and said rod, a vertical plate connected to said upper and lower plates, a conduit in said vertical plate connected to each of said chambers, a rod in said conduit in frictional contact with the walls of said conduit, a helical groove in said rod, and a liquid in said chambers, conduit and groove.

References Cited in the file of this patent

UNITED STATES PATENTS

| | | |
|---|---|---|
| 2,063,495 | Elsom | Dec. 8, 1936 |
| 2,391,966 | Harrison | Jan. 1, 1946 |
| 2,481,792 | Statham | Sept. 13, 1949 |
| 2,484,165 | Hathaway | Oct. 11, 1949 |

FOREIGN PATENTS

| | | |
|---|---|---|
| 533,423 | France | Dec. 9, 1921 |
| 236,044 | Switzerland | May 16, 1945 |